Sept. 27, 1966            G. K. LAU            3,275,337
AUXILIARY HANDLE FOR COASTER WAGON
Filed Aug. 13, 1964
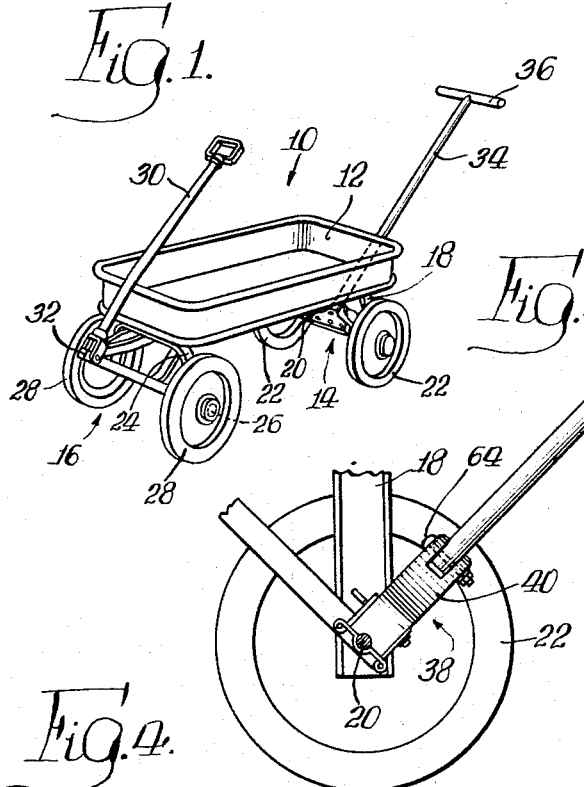
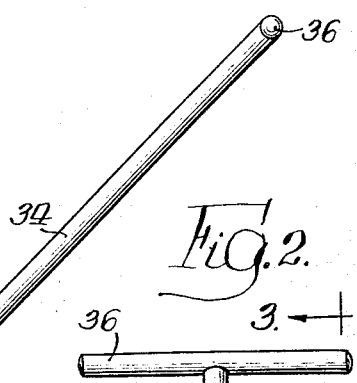
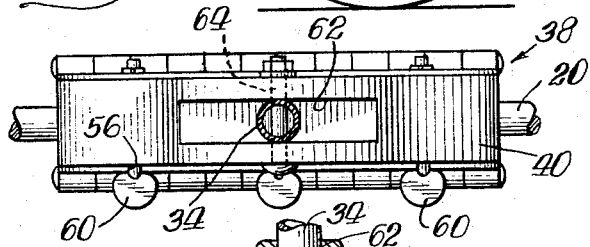
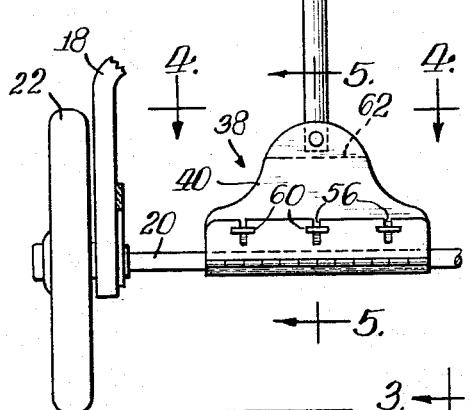
INVENTOR.
Gary K. Lau,
BY Brown, Jackson,
Boettcher & Dienner Attys.

United States Patent Office 3,275,337
Patented Sept. 27, 1966

3,275,337
AUXILIARY HANDLE FOR COASTER WAGON
Gary K. Lau, 1407 Emerald Ave., Chicago Heights, Ill.
Filed Aug. 13, 1964, Ser. No. 389,305
1 Claim. (Cl. 280—87.1)

My present invention relates generally to an auxiliary handle for a coaster wagon and more particularly to an auxiliary handle that is adapted to be used to push the wagon.

A conventional coaster wagon has a main body section supported on a rear wheel and axle assembly and on a front steering wheel and axle assembly. As is well known, the wagon is steered by manipulation of a handle pivotally mounted at one end to the front steering wheel and axle assembly. Quite commonly, children like to sit and ride in a wagon, while another person furnishes the motive power necessary to propel the wagon and passenger. Heretofore, movement of the wagon and passenger has been effected either by pulling the front steering handle, or by pushing directly on the rear end of the wagon body. These procedures have various disadvantages. In the first case, it is difficult, if not impossible, for the person pulling the wagon to continuously maintain a watchful eye on the safety and well being of the child in the wagon. At the same time, the child riding in the wagon is deprived of the experience and enjoyment of steering the wagon himself. In the second case, it is usually necessary for the person pushing the wagon to bend over to reach the rear end of the wagon body. In this position, the person not only is uncomfortable, but also finds it difficult to maintain an unobstructed view of the path of travel of the wagon.

It is an object of my present invention to provide an attachment for a coaster wagon whereby the latter and a child therein may be conveniently propelled manually without the disadvantages attendant to the existing procedures outlined above.

It is another object of my present invention to provide an auxiliary handle for a coaster wagon whereby the latter may be conveniently pushed by a person in a generally erect position.

It is another object of my present invention to provide an auxiliary handle for a coaster wagon, as described, which is adapted to be secured at its one end to the rear axle of the coaster wagon.

It is a further object of my present invention to provide an auxiliary handle for a coaster wagon, as described, which may be readily attached to and detached from the rear axle of the coaster wagon.

It is a still further object of my present invention to provide an auxiliary handle for a coaster wagon, as described, which is simple in construction and which is economical to manufacture and assemble.

Now in order to acquaint those skilled in the art with the manner of constructing and using auxiliary handles for coaster wagons in accordance with the principles of my present invention, I shall described in connection with the accompanying drawing a preferred embodiment of my invention.

In the drawings:

FIGURE 1 is a perspective view of a conventional coaster wagon with which the auxiliary handle construction of my present invention has been incorporated;

FIGURE 2 is an elevational view, on an enlarged scale, of the auxiliary handle construction, and of a portion of the rear wheel and axle assembly of the coaster wagon, of FIGURE 1;

FIGURE 3 is an elevational view of my auxiliary handle construction, taken substantially along the line 3—3 in FIGURE 2, looking in the direction indicated by the arrows;

FIGURE 4 is a view on a further enlarged scale, partly in elevation and partly in section, of my auxiliary handle construction, taken substantially along the line 4—4 in FIGURE 2, looking in the direction indicated by the arrows; and, FIGURE 5 is a fragmentary sectional view, on a scale corresponding to FIGURE 4, of the auxiliary handle construction, taken substantially along the line 5—5 in FIGURE 2, looking in the direction indicated by the arrows.

Referring now to the drawing, there is indicated generally by the reference numeral 10 a conventional coaster wagon having a main body section 12 supported on a rear wheel and axle assembly 14 and on a front steering wheel and axle assembly 16. The rear wheel and axle assembly 14 includes a generally inverted U-shaped frame member 18 suitably secured to the underside of the main body section 12, a transverse axle 20 carried in the frame member 18, and wheels 22 at the ends of the axle 20. The front steering wheel and axle assembly 16 includes an inverted generally U-shaped frame member 24 pivotally mounted to the underside of the main body section 12, a transverse axle 26 carried in the frame member 24, wheels 28 at the ends of the axle 26, and a steering handle 30 pivotally mounted at its one end to strut members 32 projecting forwardly from the frame member 24 and axle 26.

The auxiliary handle construction of my present invention comprises a handle rod 34, which may be hollow to minimize weight, having a transverse hand grip member 36 at its outer end. The inner end of the handle rod 34 is adapted to be secured to the rear axle 20 by mounting means indicated generally by the reference numeral 38. The mounting means 38 comprises a mounting block or member 40 having a semi-circular recess 42 formed in one edge thereof that is disposable longitudinally in engagement with the rear axle 20 of the coaster wagon 10. Latch means for releasably securing the mounting block 40 to the rear axle 20 comprises a first hinge element 44 secured to one side of the mounting block 40, a second hinge element 46 pivotally joined, as by a hinge pin 48, to the first hinge element 44, and a third hinge element 50 pivotally joined as by a hinge pin 52, to the second hinge element 46. The second hinge element 46 is formed with a semi-circular recess 54 that is disposable longitudinally in engagement with the rear axle 20. The third hinge element 50 is provided with one or more slots 56.

Rotatably arranged within the mounting block 40 are one or more lock bolts 58 which, at their one ends, are provided with flat heads 60 and, at their other ends, serve to secure the first hinge element 44 to the one side of the mounting block 40. The number of lock bolts 58 will will normally correspond to the number of slots 56 in the third hinge element 50. When the lock bolt heads 60 are rotated to a position lengthwise of the slots 56 in the third hinge element 50, the third hinge element 50 may be disposed in engagement with the other side of the mounting block 40 with the lock bolts 58 being received in the slots 56. Upon rotation of the lock bolt heads 60 to a position transversely of the slots 56, the inner edges of the lock bolt heads 60 serve to cam and lock the third hinge element 50 against the other side of the mounting block 40. The mounting block 40 also has a slot 62 formed in the edge thereof opposite the semi-circular recess 42. The slot 62 serves to receive the inner end of the handle rod 34. A bolt and nut assembly 64, which extends across the slot 62 and through the handle rod 34, serves to pivotally mount the handle rod 34 to the mounting block 40.

To mount the auxiliary handle construction of my present invention to the rear axle 20 of the coaster wagon 10, the lock bolt heads 60 are disposed in the position shown in dotted lines in FIGURE 5 and the latch means is permitted to assume the general position shown in dotted lines in FIGURE 5. The mounting block 40 is then positioned with the semi-circular recess 42 therein disposed longitudinally in engagement with the rear axle 42, the second and third hinge elements 44 and 50 are swung from the position shown in dotted lines to the position shown in solid lines in FIGURE 5, and the lock bolt heads 60 are rotated from the dotted line position to the solid line position. When the latch means is in the solid line position shown in FIGURE 5, the second hinge element 46 is positioned along the adjacent edge of the mounting block 40 and the semi-circular recess 54 of the second hinge element 46 is disposed longitudinally in engagement with the rear axle 20. Thus, the rear axle 20 is engaged between the semi-circular recesses 42 and 54 of the mounting block 40 and the second hinge element 46, respectively.

When the auxiliary handle construction has been mounted to the rear axle 20 in the manner described, the handle rod 34 extends rearwardly and angularly upwardly with the outer end thereof being freely movable laterally while the auxiliary handle is being used to push the coaster wagon. By reason of my auxiliary handle attachment, the coaster wagon and a child therein may be conveniently propelled manually by a person walking behind the wagon in a generally erect position. Accordingly, a person pushing the wagon by means of my auxiliary handle construction, can maintain a watchful eye on the safety and well being of the child in the wagon, and has an unobstructed view of the path of travel of the wagon. Also, since the auxiliarly handle construction permits the person pushing the wagon to walk in a generally erect position, such person experiences no discomfort while effecting movement of the wagon. Moreover, since the steering handle 30 may be manipulated by the child riding in the wagon, the child is permitted to gain the experience and enjoyment of steering the wagon himself. It will be appreciated that the auxiliary handle construction of my present invention may be readily removed from the wagon by rotating the lock bolt heads 60 to the dotted line position shown in FIGURE 5 whereupon the latch means may be released from locking engagement with the axle 20. By reason of the described latch means, my auxiliary handle construction may be readily attached to and detached from the rear axle of any conventional coaster wagon without modification thereof.

While I have shown and described what I believe to be a preferred embodiment of my present invention, it will be understood by those skilled in the art that various rearrangements and modifications may be made therein without departing from the spirit and scope of my invention.

I claim:

For use with a coaster wagon having a rear axle, a handle mounting block having a semi-circular recess formed in one end thereof disposable longitudinally in engagement with the rear axle of the coaster wagon, a first hinge element secured to one side of said mounting block, a second hinge element pivotally joined to said first hinge element, said second hinge element being positionable along said one edge of said mounting block and having a semi-circular recess formed therein disposable longitudinally in engagement with the rear axle of the coaster wagon, a third hinge element pivotally joined to said second hinge element, means for releasably securing said third hinge element to the other side of said mounting block with the rear axle of the coaster wagon being engaged between the semi-circular recesses of said mounting block and said second hinge elment, an auxiliary handle, and means pivotally mounting one end of said auxiliary handle to said mounting block whereby said auxiliary handle is permitted to extend rearwardly and angularly upwardly with the other end thereof being freely movable laterally while said auxiliary handle is being used to push the coaster wagon.

References Cited by the Examiner

UNITED STATES PATENTS

| | | | |
|---|---|---|---|
| 1,477,444 | 12/1923 | Lazear | 280—87.02 |
| 2,038,697 | 4/1936 | Winslow | 280—47.34 |
| 2,350,062 | 5/1944 | Mosier | 280—87.01 |

FOREIGN PATENTS 881,450  11/1961  Great Britain.

LEO FRIAGLIA, *Primary Examiner.*